(12) United States Patent
Brinkmann

(10) Patent No.: US 8,979,413 B2
(45) Date of Patent: Mar. 17, 2015

(54) ELEMENT OF A MODULAR SCAFFOLDING SYSTEM AND METHOD FOR ITS MANUFACTURE

(75) Inventor: Franciscus Jozef Leonardus Hubertus Brinkmann, Hamont (BE)

(73) Assignee: Scafom Holdings B.V., Budel (NL)

( * ) Notice: Subject to any disclaimer, the term of this patent is extended or adjusted under 35 U.S.C. 154(b) by 0 days.

(21) Appl. No.: 13/518,478

(22) PCT Filed: Dec. 22, 2010

(86) PCT No.: PCT/NL2010/050880
§ 371 (c)(1),
(2), (4) Date: Aug. 8, 2012

(87) PCT Pub. No.: WO2011/078670
PCT Pub. Date: Jun. 30, 2011

(65) Prior Publication Data
US 2013/0177346 A1    Jul. 11, 2013

(30) Foreign Application Priority Data

Dec. 23, 2009  (NL) .................................. 2004011

(51) Int. Cl.
*E04G 7/00* (2006.01)
*E04G 7/34* (2006.01)
(Continued)

(52) U.S. Cl.
CPC ............ *E04G 7/34* (2013.01); *B23K 9/0026* (2013.01); *B23K 9/0282* (2013.01); *B23K 9/23* (2013.01); *B23K 26/246* (2013.01); *B23K 26/285* (2013.01); *B23K 26/3293* (2013.01); *B23K 33/006* (2013.01); *E04G 7/307* (2013.01); *E04G 7/32* (2013.01); *B23K 2201/34* (2013.01)
USPC ......................................... 403/49; 182/186.8

(58) Field of Classification Search
USPC ................. 403/49, 319, 355, 161; 182/186.7, 182/186.8
See application file for complete search history.

(56) References Cited

U.S. PATENT DOCUMENTS 3,798,406 A * 3/1974 Becker ........................... 219/92
4,595,077 A * 6/1986 Buttgereit .................. 182/186.8
(Continued)

FOREIGN PATENT DOCUMENTS

| DE | 10135611 A1 | 2/2003 |
| DE | 202006015586 U1 | 2/2008 |
| EP | 0074224 A1 | 3/1983 |

OTHER PUBLICATIONS

International Search Report, PCT/NL2010/050880, Mailing date: Apr. 18, 2011.

*Primary Examiner* — Michael P Ferguson
*Assistant Examiner* — Daniel Wiley
(74) *Attorney, Agent, or Firm* — Banner & Witcoff, Ltd.

(57) ABSTRACT

In a method for manufacturing an element (8) of a modular scaffolding system, an at least partly galvanized pipe part (10) having a first end (12) and a second end is provided, together with an at least partly galvanized first connection head (40) which is designed to be connected to the first end (12) of the pipe part (10). A weld (24), which connects the first end (12) of the pipe part (10) to the first connection head (40), has an internal weld surface (24b) and an external weld surface (24a). The internal weld surface is proximal to the pipe part (10) and/or the connection head (40), and the external weld surface is proximal to an outside environment (60) of the pipe part (10) and the connecting head (40). A protective layer covers the external weld surface, such that it is screened off from the outside environment (60).

10 Claims, 3 Drawing Sheets

(51) Int. Cl.
- *B23K 9/00* (2006.01)
- *B23K 9/028* (2006.01)
- *B23K 9/23* (2006.01)
- *B23K 26/24* (2014.01)
- *B23K 26/28* (2014.01)
- *B23K 26/32* (2014.01)
- *B23K 33/00* (2006.01)
- *E04G 7/30* (2006.01)
- *E04G 7/32* (2006.01)

(56) References Cited

U.S. PATENT DOCUMENTS

| | | | |
|---|---|---|---|
| 5,127,757 A * | 7/1992 | Langer | 403/49 |
| 6,646,225 B1 * | 11/2003 | Wang et al. | 219/121.64 |
| 2003/0219542 A1 * | 11/2003 | Ewasyshyn et al. | 427/421 |
| 2006/0039746 A1 | 2/2006 | Stringer | |
| 2007/0289951 A1 | 12/2007 | Borne et al. | |
| 2010/0078263 A1 | 4/2010 | Kreller | |

* cited by examiner

ELEMENT OF A MODULAR SCAFFOLDING SYSTEM AND METHOD FOR ITS MANUFACTURE

CROSS-REFERENCE TO RELATED APPLICATIONS

This application is a U.S. National Stage application under 35 U.S.C. §371 of International Application PCT/NL2010/050880 (published as WO 2011/078670 A1), filed Dec. 22, 2010 which claims priority to Application NL 2004011, filed Dec. 23, 2009. Benefit of the filing date of each of these prior applications is hereby claimed. Each of these prior applications is hereby incorporated by reference in its entirety.

BACKGROUND

A modular scaffolding system comprises, inter alia, standards, ledgers and diagonals. Usually, these elements are manufactured from steel. A standard can comprise an elongate pipe part having at a first end a male end and having at an opposite, second end a female end. Different standards can thus be linked together or "stacked" to form columns which, with a scaffold in an assembled condition, extend in substantially vertical direction. Each of the standards can, with the aid of, for instance, a welded connection, be provided along a circumference with one or more rosettes or flanges, so that a column assembled from standards comprises such rosettes over its entire length/height at fixed mutual distances (e.g. 0.5 m). Each of the rosettes can function as connecting point or node for ledgers and diagonals. To this end, the ledgers and diagonals can be provided at their respective ends with a connection head which is designed for engaging a rosette, and which is fixedly attachable thereto with the aid of a wedge that can be driven through both the connection head and a wedge hole provided in the rosette. A wedge is preferably non-detachably connected to a connection head in order to promote rapid assembly of a scaffold and to prevent the wedge becoming lost.

A ledger can comprise an elongate pipe part having a connection head at both ends thereof. Both the pipe part and the connection heads can be steel products. Nowadays, assembling the ledger from the pipe part and the connection heads is done by welding the untreated, so-called "black", connection heads to the likewise untreated or black pipe part, and then hot dip galvanizing the ledger both internally and externally. With hot dip galvanizing, the ledger is submerged for some time in a bath of liquid zinc at a temperature of approximately 450° C. As a result, on the ledger, zinc alloy layers form and, right on an outside, a pure zinc layer, which layers protect the ledgers from corrosion. A drawback of hot dip galvanizing is that on the product leaving the zinc bath drops and other drip residues can form. After hot dip galvanizing, the ledger must be cleared of these zinc residues, to remove, inter alia, sharp points/edges from the ledger, and to prevent the zinc residues causing tolerance or fitting problems upon assembly of a scaffolding. Further, after removal of the zinc residues, in order to complete the ledger, to each of the connection heads a wedge is mounted.

Both hot dip galvanizing the ledger, including the step required afterwards of removing the zinc residues, and mounting wedges to otherwise completed ledgers are relatively time-consuming, and therefore costly.

SUMMARY OF THE INVENTION

It is an object of the invention to provide a production method for an element of a modular scaffolding system, such as for instance a ledger, which is less labour intensive, and therefore less costly than the known method.

To that end, one aspect of the present invention is directed to a method for manufacturing an element of a modular scaffolding system. The method comprises providing an at least partly galvanized pipe part having a first and a second end, and providing an at least partly galvanized first connection head which is designed to be connected to the first end of the pipe part. Insofar as required, the method can comprise removing zinc from places of the pipe part and the first connection head where a weld will be provided in order to mutually connect the first end of the pipe part and the first connection head. The method further comprises forming, through welding, the weld which connects the first end of the pipe part to the first connection head. The weld defines an internal weld surface and an external weld surface, which internal weld surface is proximal to the pipe part and/or the connection head, and which external weld surface is proximal to an outside environment of the pipe part and the connection head. The method also comprises covering the external weld surface with a protective layer, such that the external weld surface is screened off from the outside environment.

The method according to the present invention is also based on the concept of assembly of the element not from untreated, but from pre-galvanized parts. (Pre)galvanizing the pipe part and the first connection head can be effected in a conventional yet, when compared to hot dip galvanizing, more economic manner. For instance, the pipe part can be formed from a flat steel plate, which steel plate has beforehand—when it was still a wound-off part of a roll of strip metal—been guided through a bath of liquid zinc in a so-called continuous or Sendzimir galvanizing process. The zinc layers applied with this process show hardly any dripping residues, if at all, and further also have a good uniformity. The first connection head can be provided by means of, for instance, centrifugal galvanizing, with an even, protective zinc layer having a uniform thickness. The fact that the zinc layers applied during continuous and centrifugal galvanizing have a uniform thickness is an additional advantage when compared to hot dip galvanizing. The fact is that a zinc protective layer applied by means of hot dip galvanizing is often not uniform, so that it may happen that contact surfaces of the ledger are covered to an excessive extent with (compared to steel relatively soft) zinc. This may adversely affect the behaviour of the ledger in an assembled scaffold. Through the use of the alternative galvanizing methods mentioned, the total costs of an element, when compared to the known method based on hot dip galvanizing, can be reduced approximately by half, while the quality of the end product (especially the uniformity of the zinc protective layer) can be improved.

According to a further elaboration of the method according to the present invention, prior to welding, the connection head can be provided with a wedge.

What is prevented by mounting the wedge to the connection head prior to welding is that the almost complete, and therefore relatively heavy and cumbersome element has to be handled as a whole for the purpose of fastening the wedge. Instead, according to the proposed method, only the relatively small first connection head needs to be handled, for instance by bringing it to a wedge mounting location, where the wedge can be attached. It will be clear that thus, costs are saved.

When welding the pipe part and the first connection head, a weld is formed which connects the two parts. The weld comprises an inside or internal weld surface and an outside or external weld surface. The internal weld surface can typically be a (surface) part of the weld which is located on a side of the weld remote from the outside environment, and is thus proximal to the pipe part and/or the connection head. The external weld surface can typically be a (surface) part of the weld located on a side of the weld proximal to the outside environment and which—if it is not covered by an additional protective layer—at its surface is in direct contact with the outside environment. After welding, the external weld surface of the weld can simply and rapidly be finished/coated, for instance by spraying it with a layer of liquid zinc at high temperature. As a result, a protective layer is applied which protects the weld at its outside against corrosion. After cooling down of the sprayed-on zinc, the element is, in principle, ready for use. There is no need for removing zinc residues, nor is there any need for a finishing operation, for instance by providing the connection heads with wedges.

A problem that occurs when an element according to the proposed method is manufactured, is that the internal weld surface of the weld between the pipe part and the first connection head might not be sufficiently protected from corrosion. As stated, the outside of the weld can be covered simply and rapidly, for instance by spraying on or otherwise applying a layer of protective zinc. But unlike the outside of the weld, the inside thereof is normally hardly accessible. This is due, on the one hand, to the fact that the connection head typically gives access to the interior of the pipe part only via a narrow opening, and, on the other hand, to the fact that as a rule, a part of the connection head is received in the interior of the pipe part. As, normally, a weld is provided on an extreme edge on an end of the pipe part, the part of the connection head received in the pipe part forms a practical blockade to mechanical or instrumental access to the inside of the weld. In combination with the already narrow openings to the interior of the pipe part, this renders finishing the inside of the weld particularly complicated. It should be considered here that the customarily used method for finishing the inside of the weld, i.e. hot dip galvanizing, would undo the advantages of the proposed method at least partly. Not only would already galvanized parts be re-galvanized, the hot dip galvanizing would again entail labour intensive treatment. The first drawback also holds true for many other customary surface treatments.

According to a further elaboration of the method according to the invention, the internal weld surface is therefore screened off from air coming from the outside environment without an additional surface treatment.

Here, "additional surface treatment" is understood to include in particular surface treatments such as, for instance, galvanizing, hot dip galvanizing, schoop processing, spraying with powder, sherardizing, painting and other forms of coating or applying a protective layer, which are carried out after formation of the weld on or to a surface of the pipe part and/or the first connection head. The screening can be realized in different manners.

In one embodiment of the method, one of the first end of the pipe part and the first connection head has an inside circumferential edge, while the other of the first end of the pipe part and the first connection head has an outside circumferential edge designed for cooperation with the inside circumferential edge.

Further, prior to welding, on at least one of the inside circumferential edge and the outside circumferential edge, a sealing material is applied, and, prior to welding, the inside circumferential edge is positioned opposite the outside circumferential edge in order to bring the first end of the pipe part and the first connection head in a relative position in which they will be connected to each other through welding. In the relative position mentioned, a location where the weld will be provided is in fluid communication with the outside environment, via a passage between the inside circumferential edge and the outside circumferential edge. During welding, the sealing material between the inside circumferential edge and the outside circumferential edge is melted such that after welding, the inside circumferential edge and the outside circumferential edge are mutually connected by the sealing material and the passage therebetween is sealed off by the sealing material in a fluid tight manner.

Thus, it is effected that the inside of the weld is sealed off during welding. After welding, no additional treatment for screening off the internal weld surface is required any longer.

In a particularly advantageous embodiment of the method, the sealing material is zinc, which zinc is already present on at least one of the provided at least partly galvanized pipe part and the provided at least partly galvanized first connection head. Thus, a separate step for applying sealing material is avoided.

According to a further elaboration of the method, in the relative position in which the first end of the pipe part and the connection head will be connected through welding, the inside circumferential edge and the outside circumferential edge are opposite each other with, between the two, a clearance in the range of 0.2-0.7 mm.

On the one hand, too little clearance can hinder rapid assembly of the element, and during welding, prevent flowing together of the melted zinc in the passage between the inside circumferential edge and outside edge. It should be considered here that, immediately adjacent the welding location, as a result of the heat during welding, the zinc may burn. Sealing the passage is therefore dependent on the flowing together of zinc at a slightly larger distance from the weld, at a location where the temperature is slightly lower. As a result of the good heat conduction in the typically steel element, the temperature at that location will no longer be high enough to allow the zinc to flow freely. The actual sealing of the passage should therefore take place within a relatively short time, which can be ensured by a specific minimum passage width or clearance. On the other hand, too much clearance can prevent the sealing material present on at least one of the inside circumferential edge and the outside circumferential edge from reaching the opposite other circumferential edge during heating. This may lead to the situation where the passage between the inside circumferential edge and the outside circumferential edge, whose width corresponds to the clearance mentioned, is not bridged and therefore not sealed off fluid tightly. In practice, a clearance in the range of 0.2-0.7 mm prevents such problems. It is noted that the clearance does not have to be the same along the entire (lengths of the) inside circumferential edge and the outside circumferential edge nor does it have to be in the range mentioned, although the latter is preferred. In principle, it suffices that locally, therefore on at least one location, there is a minimum clearance of 0.2 mm, while preferably, the maximum clearance between the two circumferential edges is nowhere greater than 0.7 mm.

In another embodiment of the method according to the present invention, after welding, the first connection head seals off the first end of the pipe part in a fluid tight manner.

In this embodiment, the first connection head serves as a (permanent) sealing element of the pipe part. When, at the second end of the pipe part too, a sealing element is provided, preferably in the form of a second connection head so that this second end too can be connected to a standard with, for instance, a rosette, then the interior of the pipe part is completely screened off from the outside environment. Accordingly, the internal weld surfaces accessible via the interior of the pipe part, i.e. the inside(s) of the weld(s) associated with the first and/or second connection head, are screened off too from the ambient air of the scaffolding system element. As a result, no corrosion or at least no progress of corrosion can take place on these internal weld surfaces.

Sealing off the interior of the pipe part with the aid of one or more connection heads can be carried out in a relatively dry and/or oxygen poor ambient atmosphere, so that no excess amounts of moisture and/or oxygen are entrapped in the interior. An oxygen rich and/or moist atmosphere in the interior of the pipe part could give rise to the start of the formation of corrosion, in particular to the interior weld surfaces.

Another aspect of the present invention is directed to an element of a modular scaffolding system, such as for instance a ledger, standard or diagonal, which is manufactured according to the method of the present invention.

According to a first embodiment, such an element comprises an at least partly galvanized pipe part having a first end and a second end, and an at least partly galvanized first connection head which is connected to the first end of the pipe part, wherein one of the first end of the pipe part and the first connection head comprises an inside circumferential edge, and the other of the first end of the pipe part and the first connection head comprises an outside circumferential edge designed for cooperation with the inside circumferential edge. The element further comprises a weld which connects the first end of the pipe part to the first connection head, the weld comprising an internal weld surface and an external weld surface, which internal weld surface is proximal to the pipe part and/or the connection head, and which external weld surface is proximal to an outside environment of the pipe part and the connection head. The element further comprises a protective layer which screens the external weld surface from the outside environment, and a sealing material mass melted during formation of the weld and thereupon hardened, preferably of zinc, which seals off a passage located between the inside circumferential edge and the outside circumferential edge in a fluid tight manner such that the internal weld surface is not in fluid communication with the outside environment via the passage.

According to a second embodiment, such an element comprises an at least partly galvanized pipe part having a first and a second end, and a first at least partly galvanized connection head and a second at least partly galvanized connection head. The element also comprises a first weld which connects the first end of the pipe part to the first connection head, and a second weld which connects the second end of the pipe part to the second connection head. In addition, the element comprises a first protective layer which screens an external weld surface of the first weld from the outside environment, and a second protective layer which screens off an external weld surface of the second weld from the outside environment. The first and second connection heads seal an interior of the pipe part, and hence internal weld surfaces of the first and second welds which are in fluid communication with the interior of the pipe part, off from the outside environment in a fluid tight manner.

In the following, the above-mentioned and further features and advantages of the invention will be elucidated on the basis of a few exemplary embodiments of the invention.

DETAILED DESCRIPTION

Figure 1:
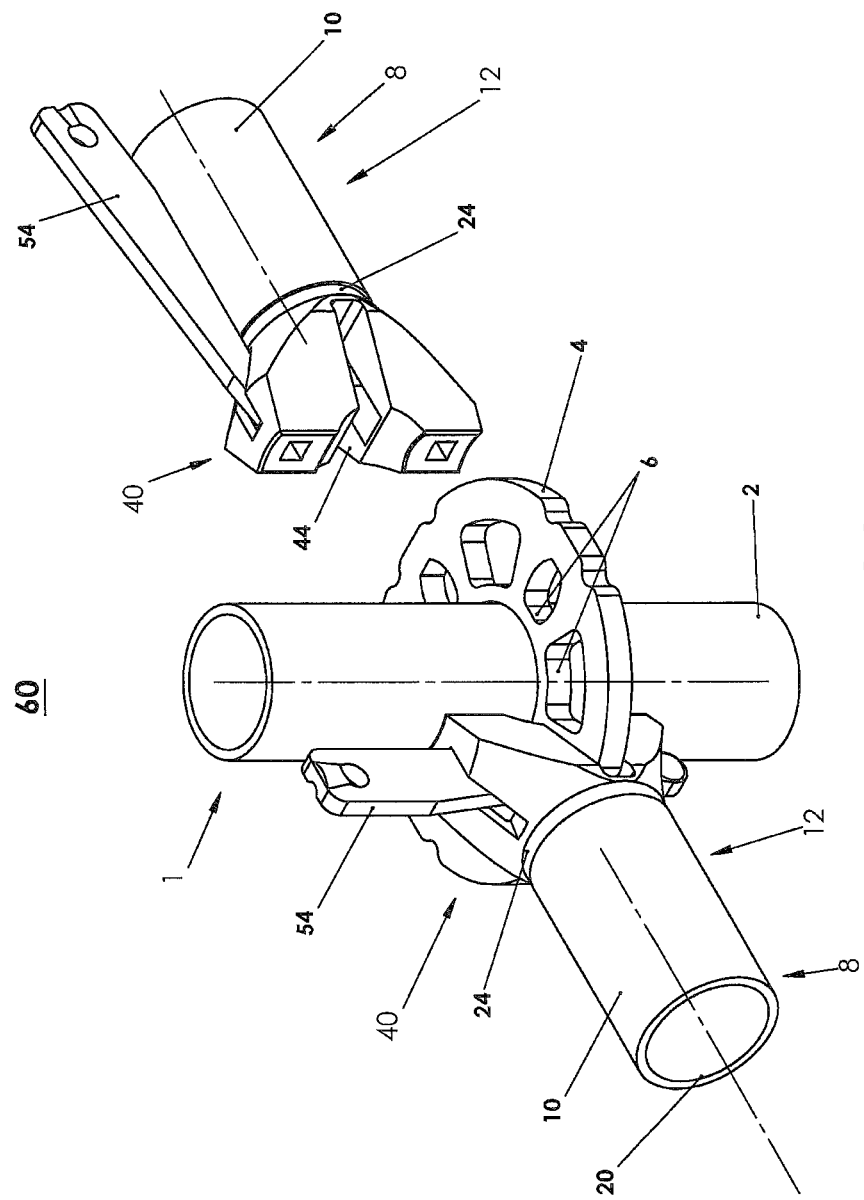
FIG. 1 is a schematic, perspective view of a node of a modular scaffolding system, formed by a vertical standard which is provided with a rosette on which engages a ledger provided with a connection head.

FIG. 1 schematically shows a perspective view of a node 1 of an exemplary embodiment of a modular scaffolding system, which scaffolding system comprises elements manufacturable with the aid of the disclosed method. The node 1 is formed by a standard 2 (only partly represented) extending substantially vertically, which standard is provided all around with a rosette or flange 4 which serves as point of engagement for, for instance, diagonals (not shown) and ledgers (8).

The ledgers 8 comprise, as does the standard 2, a hollow, cylinder shell pipe part 10. With the ledgers 8, on both sides of this elongated pipe part 10, a connection head 40 is fastened by means of a weld 24. Such a weld 24 always extends around the pipe part 10 and the connection head 40. Only one end of the ledgers 8 is represented, for that matter: a second ledger end, which is located opposite the first end, can be structurally identical to the first end and be manufactured in a similar manner.

A connection head 40 comprises a rosette-receiving-recess 44 for receiving (an edge of) the rosette 4 therein. Further, a connection head 40 is provided with a wedge 54 movably mounted thereon and a substantially vertically oriented wedge passage 42 arranged for reception of this wedge (see FIGS. 2 and 3). When a rosette-receiving-recess 44 engages (an edge of) the rosette 4, the wedge passage 42 can be aligned in the connection head 40 with a wedge hole 6 provided in the rosette, such that the wedge 54 mounted on the connection head 40 can be driven through the wedge passage 42 as well as the wedge hole 6 in the rosette 4 for fastening the connection head 40 to the rosette 4.

Presently, with reference to FIGS. 2 and 3, an element according to the present invention, more particularly a ledger 8 as shown in FIG. 1, and a method for the manufacture thereof will be described. It should be noted here that in FIGS. 2 and 3, the welds 35 are not yet provided on an outside with a protective layer, and that the welds are represented only at a top of the cross-sections to allow a view on the connection between the pipe part 10 and the connection head 40. In reality, a weld preferably always runs all around the longitudinal direction of the pipe part 10.

As stated, a ledger 8 can be composed of an elongate, cylinder shell pipe part 10 and two connection heads 40 provided on opposite sides thereof. The pipe part 10 can be a so-called longitudinal seam welded pipe part which is formed by rolling a flat steel plate into a pipe shape, and thereupon connecting the opposed longitudinal sides to each other by means of a single welding seam. The connection heads 40 can be manufactured through, for instance, casting from steel. The pipe part 10 as well as the connection heads 40 can be galvanized in a conventional manner, for instance through Sendzimir-galvanizing or centrifugal galvanizing. If desired, a connection head 40 can further be provided, before or after galvanizing, with a wedge 54 non-detachably connected thereto (see FIG. 1; not shown in FIGS. 2 and 3). The pipe part 10 and the connection heads 40 are designed to be connected to each other for forming a ledger 8. However, for different embodiments of the invention, the exact mutual gearing can differ from a structural point of view.

Figure 2:
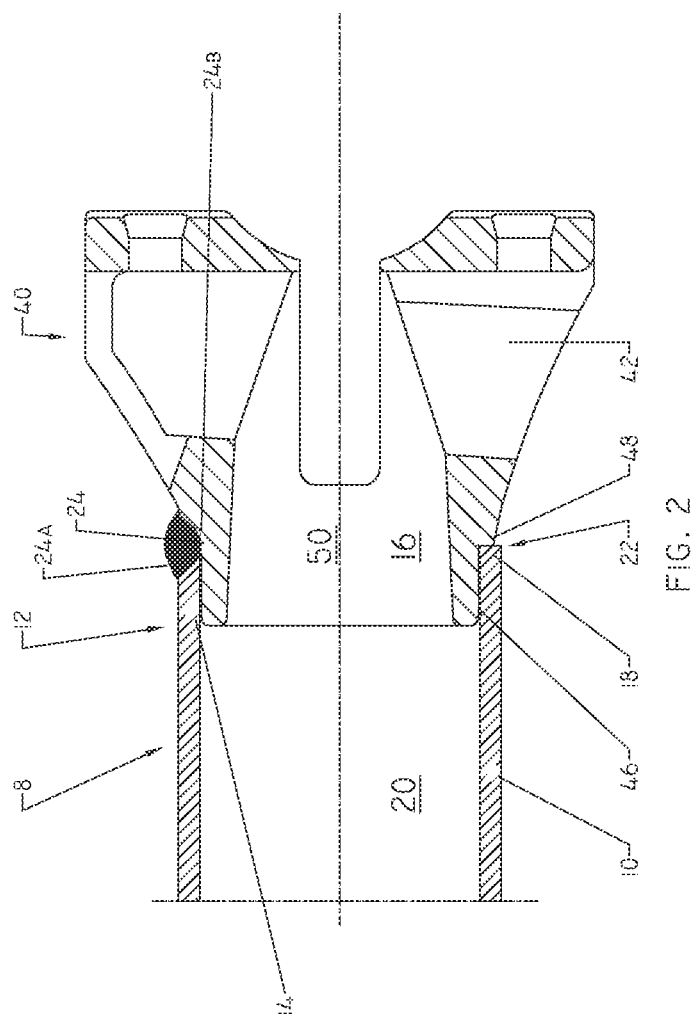
FIG. 2 is a schematic longitudinal cross-section of a ledger end according to a first exemplary embodiment of the present invention.

In a first embodiment of the ledger 8, schematically illustrated in FIG. 2, a first end 12 of the pipe part 10 can be provided with, for instance, an inside circumferential edge 14. In case of a cylinder shell pipe part 10, this inside circumferential edge 14 can follow a circular band along an inside surface of the pipe part, and be located immediately adjacent a first opening 16 of the first end 12 of the pipe part 10. The width of the inside circumferential edge 14, viewed in the longitudinal direction of the pipe part 10, can typically be 2-10 mm. Optionally, the inside circumferential edge 14 of the first end 12 of the pipe part 10 can be worked, before or after galvanizing, in order to accurately shape the contours thereof, so that with an accurately defined clearance an outside circumferential edge 46 of a connection head 40 (also finished) can be received in the pipe part 10 and can be positioned opposite the inside circumferential edge 14. In case of a cylinder shell pipe part 10, the cylindrical finishing process for calibration of the inside circumferential edge can be carried out relatively simply. The outside circumferential edge 46 provided at the connection head, at an exterior of a cylinder shell apron, can have a width similar to the inside circumferential edge 14 of the first end 12 of the pipe part 10, and the contours/outside diameter of this outside circumferential edge 46 too can be calibrated prior to or after galvanizing. It is preferred that eventually the galvanized outside circumference 46 can be received in the pipe part 10 with a clearance in the order of tenths of millimetres, e.g. 0.2-0.7 mm, and be placed opposite the likewise galvanized inside circumferential edge 14.

After the locations on the pipe part 10 and on the connection head 40 where the weld connection will be provided have been cleared of zinc, if required, the outside circumferential edge 46 of the connection head 40 can actually be placed opposite the inside circumferential edge 14 of the first end 12 of the pipe part 10 in preparation for welding. Here, the connection head 40 is partly received in the interior 20 of the pipe part 10. The locations to be cleared of zinc, as regards the pipe part 10, are typically located near a circumferential edge 18 which defines an opening 16 in an end of the pipe part 10, and, as regards the connection head 40, are typically located adjacent a shoulder 48 which is located along and/or adjacent to the outside circumferential edge 46, against which shoulder 48 the opening defining circumferential edge 18 of the pipe part 10 comes to lie when the connection head 40 is partly received in the pipe part 10. Then, the weld 24 can be provided, preferably all around, for forming an extremity of the ledger 8.

During welding, at and near the location 22 where the weld is provided, heat is generated which, via for instance conduction into the ledger 8 to be manufactured, heats both the inside circumferential edge 14 of the pipe part 10 and the outside circumferential edge 46 of the connection head 40. As the temperature required for providing the weld 24 between the typically steel pipe part 10 and the typically steel connection head 40 (>1000° C.; depending on the type of steel) is significantly higher than the melting temperature of zinc (approximately 420° C.), the galvanized inside circumferential edge 14 and outside circumferential edge 46 will be heated to at least this melting temperature. Consequently, the zinc layer provided on the inside circumferential edge 14 will fuse with the zinc layer provided on the outside circumferential edge 46, and form a fused (zinc) mass which seals a passage or gap between the inside circumferential edge and the outside circumferential edge in an airtight or fluid tight manner. Thus, the access to an inside 24b of the weld 24 is sealed off from the interior 20 of the pipe part as well as from the outside environment 60. If desired, an outside 24a of the weld can be sealed off by applying a protective layer, for instance through zinc spraying.

Figure 3:
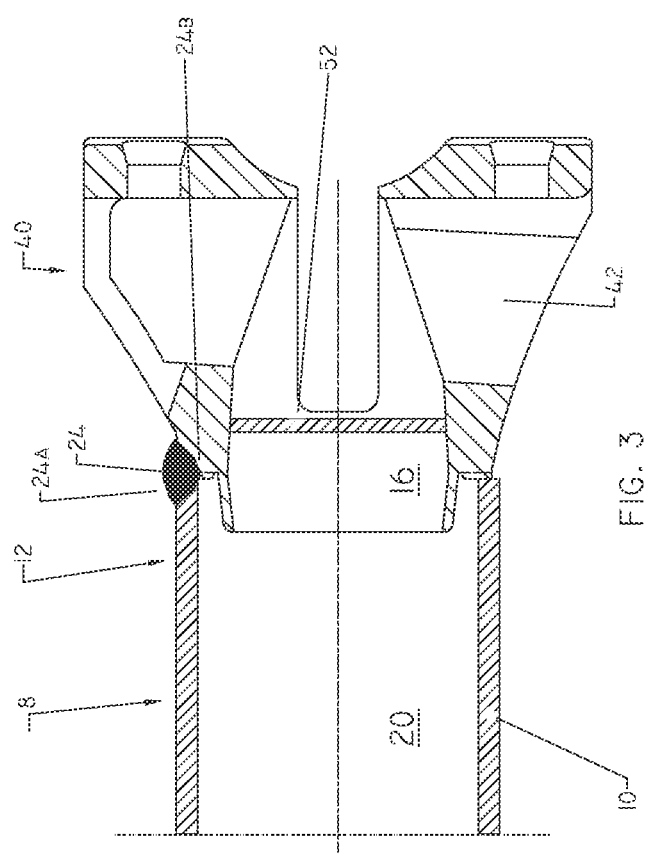
FIG. 3 is a schematic, longitudinal cross-section of a ledger end according to a second exemplary embodiment of the present invention.

In a second exemplary embodiment of a ledger 8 according to the present invention, schematically illustrated in FIG. 3, a connection head 40 is designed as a sealing element which is provided on an end of the pipe part 10. At the location where, in the exemplary embodiment of FIG. 1, the connection head 40 has a continuous passage 50 which, when the connection head 40 is provided on an end 12 of the pipe part 10, gives access from an outside environment 60 to the interior 20 of the pipe part 10, according to the second exemplary embodiment, this passage in the connection head 40 is sealed off with the aid of a partition 52. Preferably, but not necessarily, this partition 52 is an integral part of the connection head 40. Fastening the connection head 40 to the end 12 of the pipe part 10 by means of a weld 24 therefore seals off the respective end of the pipe part from the outside environment 60. In order to obtain a complete seal of the interior 20 of the pipe part 10, a sealing connection head must be provided on both ends of the pipe part. As a result, supply of oxygen or moisture from the environment 60 of the ledger 8 to the interior 20 thereof can no longer take place, with the result that in the interior of the pipe part, which is also bound by an inside 24b of the weld 24, no corrosion or at least no progressive corrosion is possible any longer.

Although in the foregoing the present invention is elucidated on the basis of a few exemplary embodiments, it should be noted that the invention is not limited to these exemplary embodiments. A skilled person can provide various adaptations and alterations in the discussed exemplary embodiments without departing from the inventive concept and scope of the invention, as laid down in the following claims. In particular, different exemplary embodiments of the invention described hereinabove can be combined to form new embodiments.

LIST OF REFERENCE NUMERALS 1. node of modular scaffolding system
2. standard
4. rosette
6. wedge hole in rosette
8. ledger
10. pipe part
12. first end of the pipe part
14. inside circumferential edge of the first end pipe part
16. opening in first end pipe part
18. opening defining circumferential edge
20. interior of the pipe part
22. welding location
24. weld (connection)
24a. external weld surface
24b. internal weld surface
40. first connection head
42. wedge passage
44. rosette receiving recess
46 outside circumferential edge
48. shoulder along outside circumferential edge
50. continuous passage in connection head
52. partition
54. wedge
60 outside environment ledger

The invention claimed is:
1. A method for manufacturing an element of a modular scaffolding system, comprising:

providing an at least partly galvanized pipe part having a first end and a second end;

providing an at least partly galvanized first connection head which is designed to be connected to the first end of the pipe part;

forming, through welding, a weld which connects the first end of the pipe part to the first connection head, the weld comprising an internal weld surface and an external weld surface, which internal weld surface is proximal to the pipe part and/or the connection head, and which external weld surface is proximal to an outside environment of the pipe part and the connecting head;

covering the external weld surface with a protective layer, such that the external weld surface is screened off from the outside environment; and permanently sealing off the internal weld surface against air, wherein the sealing is not performed by an additional surface treatment of the internal weld surface after the weld is formed;

wherein, for the purpose of permanently sealing off the internal weld surface, one of the first end of the pipe part and the first connection head comprises an inside circumferential surface area, and the other of the first end of the pipe part and the first connection head comprises an outside circumferential surface area that is co-axial with, and designed for cooperation with the inside circumferential surface area; and wherein prior to welding, on at least one of the inside circumferential surface area and the outside circumferential surface area a sealing material has been applied; the method including positioning, prior to welding, the inside circumferential surface area opposite the outside circumferential surface area in order to bring the first end of the pipe part and the first connection head in a relative position in which they will be connected to each other through welding, in which relative position a passage is present that is embodied as a small clearance between the inside and outside circumferential surface areas; and melting, during welding, the sealing material between the inside circumferential surface area and the outside circumferential surface area such that after welding, the inside circumferential surface area and the outside circumferential surface area are mutually connected by the sealing material, whereby the clearance is sealed off by the sealing material in a fluid tight manner and by virtue thereof the internal weld surface is sealed off from air.

2. The method according to claim 1, wherein the external weld surface is covered with the protective layer by means of thermal spraying of zinc.

3. The method according to claim 1, wherein the sealing material is zinc, which zinc is already present on at least one of the provided at least partly galvanized pipe part and the provided at least partly galvanized first connection head.

4. The method according to claim 1, wherein the inside circumferential surface area and the outside circumferential surface area are both cylinder shell-shaped.

5. The method according to claim 1, wherein, in the relative position in which the first end of the pipe part and the connection head will be connected to each other through welding, the clearance is in the range of 0.2-0.7 mm.

6. The method according to claim 1, wherein the first connection head comprises the outside circumferential surface area, and the first end of the pipe part comprises the inside circumferential surface area.

7. The method according to claim 1, further comprising:
prior to welding, removing zinc from the pipe part and the first connection head there where a weld will be provided in order to mutually connect the first end of the pipe part and the first connection head.

8. The method according to claim 1, wherein the element is a ledger.

9. An element of a modular scaffolding system, manufactured with the aid of a method according to claim 1.

10. An element according to claim 9, comprising:
an at least partly galvanized pipe part having a first end and a second end, and an at least partly galvanized first connection head which is connected to the first end of the pipe part, wherein one of the first end of the pipe part and the first connection head comprises an inside circumferential surface area, and the other of the first end of the pipe part and the first connection head comprises an outside circumferential surface area designed for cooperation with the inside circumferential surface area;

a weld which connects the first end of the pipe part to the first connection head, the weld comprising an internal weld surface and an external weld surface, which internal weld surface is proximal to the pipe part and/or the connection head, and which external weld surface is proximal to an outside environment of the pipe part and the connection head;

a protective layer which screens the external weld surface from the outside environment; and a sealing material mass melted during formation of the weld and thereupon hardened to permanently seal off the internal weld surface against air, by sealing off a passage, that is embodied as a small clearance between the inside and outside circumferential surface areas, in a fluid tight manner such that the internal weld surface is not in fluid communication with the outside environment via the passage.

* * * * *